C. A. STICKNEY.
CRANK PIN OILER.
APPLICATION FILED NOV. 12, 1915. RENEWED MAR. 14, 1917.
1,224,338.
Patented May 1, 1917.
3 SHEETS—SHEET 1.
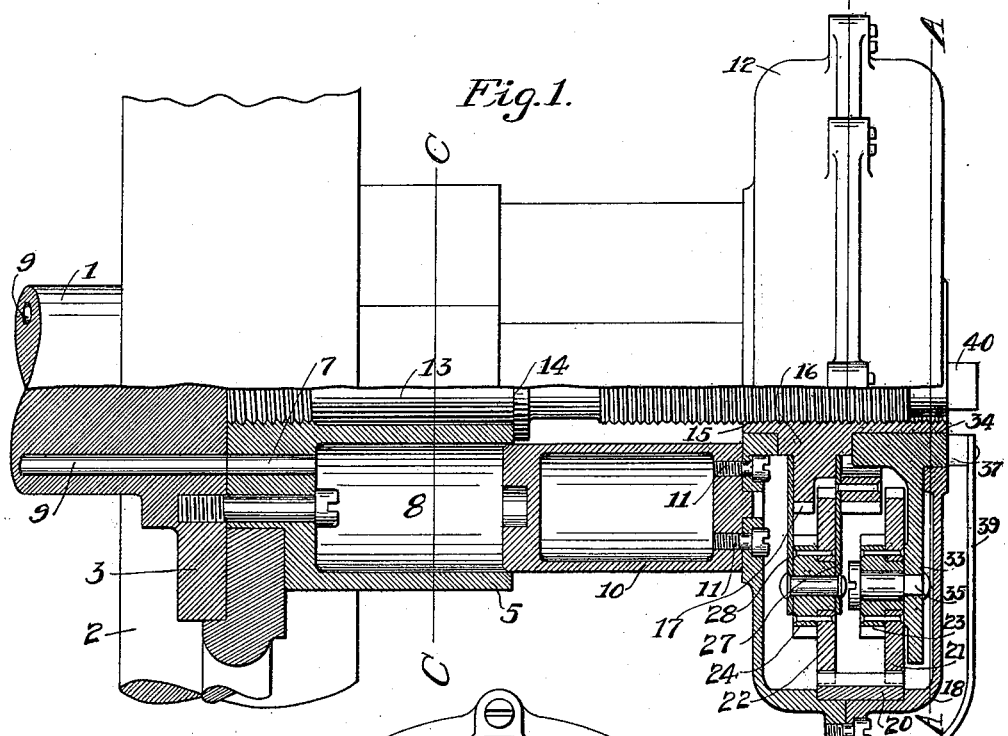
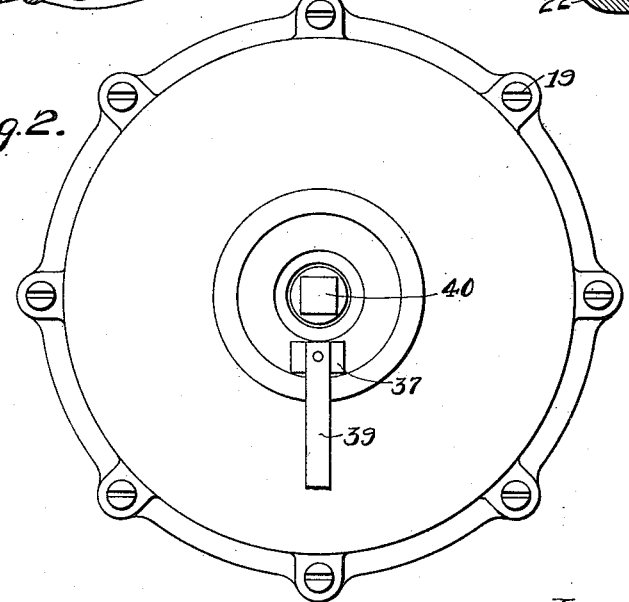
Inventor:
Charles A. Stickney.
by C. D. Enochs
Attorney.

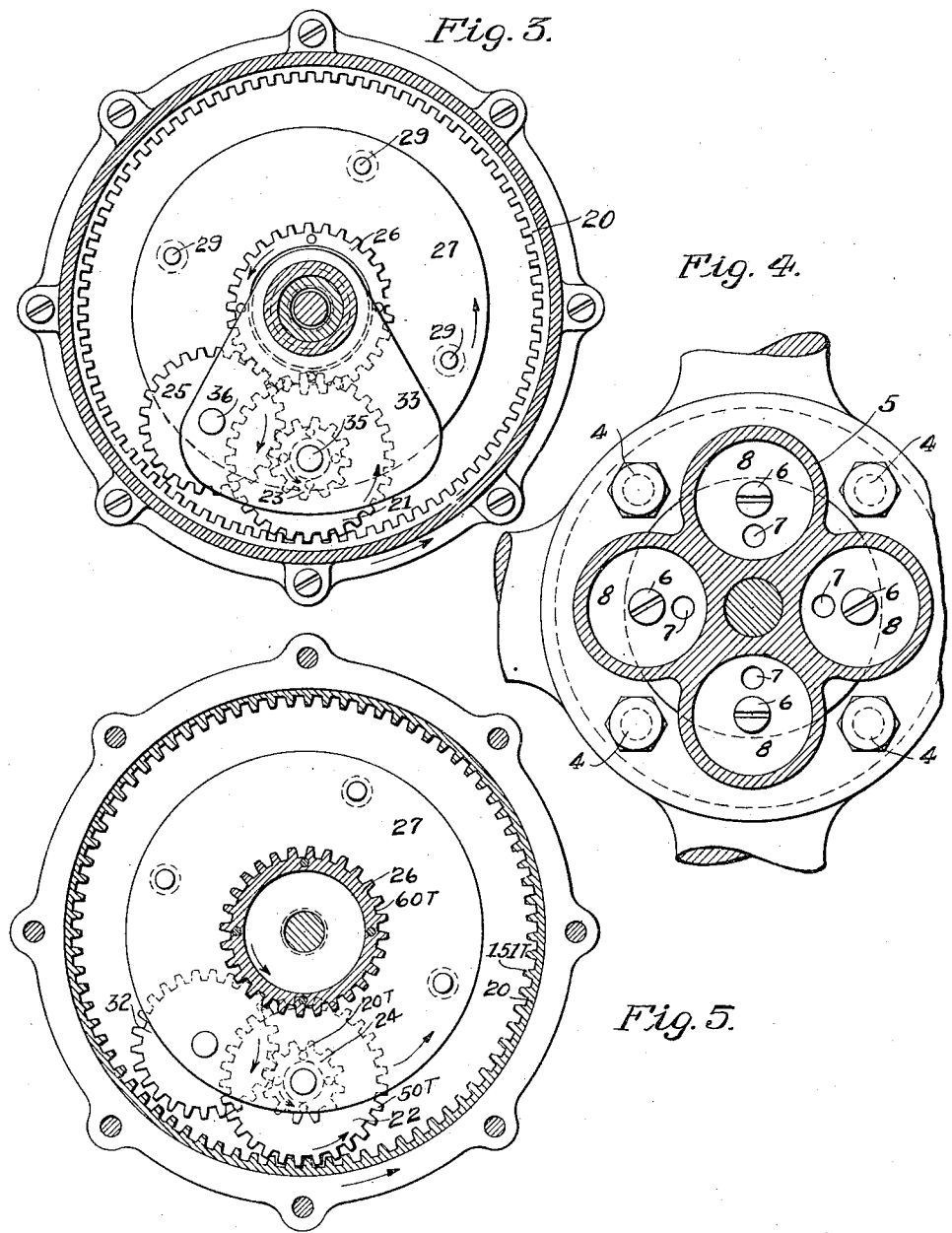

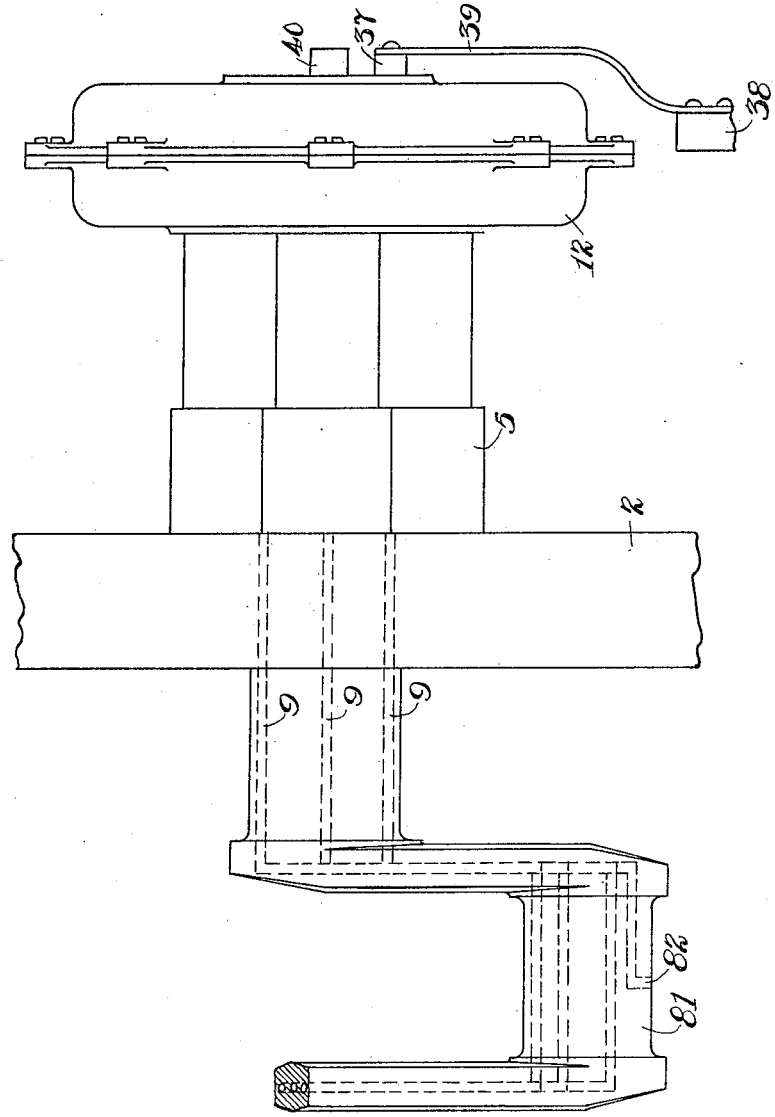

UNITED STATES PATENT OFFICE.

CHARLES A. STICKNEY, OF CHICAGO, ILLINOIS.

CRANK-PIN OILER.

1,224,338. Specification of Letters Patent. Patented May 1, 1917.

Application filed November 12, 1915, Serial No. 61,174. Renewed March 14, 1917. Serial No. 154,875.

*To all whom it may concern:*

Be it known that I, CHARLES A. STICKNEY, a citizen of the United States, residing at Chicago, county of Cook, and State of Illinois, have invented certain new and useful Improvements in Crank-Pin Oilers, of which the following is a specification.

This invention relates to oilers for supplying a lubricant to the crank pin in internal combustion engines, or to other rotating parts having the same oil requirements, and is especially adapted to supply such bearings with what is known as hard oil or grease.

One object of my invention is to provide means for supplying the crank pin with a supply of hard oil in such a manner that the amount of oil fed to the crank pin will be in direct proportion to the number of revolutions the crank pin makes.

Another object of my invention is to provide a hard oil supply from which lubricant may be fed to the crank pin automatically as the crank pin revolves, the same amount of lubricant being furnished with each revolution until the entire supply of oil contained in the reservoirs is used.

Another object of my invention is to provide means whereby it can be readily determined while the engine is running how much grease is still left in the reservoirs and how long the engine may be run without recharging the reservoirs.

The final object of my invention is to construct an oiler that will be simple and positive in action, will not easily get out of order, will be readily accessible, and in which the reservoirs may be easily refilled.

With this and incidental objects in view the invention consists in certain novel features of construction and combination of parts, the essential elements of which are set forth in appended claims and a preferred form of embodiment of which is hereinafter described with reference to the drawings which accompany and form a part of this specification.

In the drawings in Figure 1 is disclosed a side view of the oiler partly in section through the center line of the crank shaft 1 of the engine.

Fig. 2 is an end view of my improved oiler, and Fig. 3 is a section taken on the line A A, Fig. 1. Fig. 4 is a section taken on the line C C, and Fig. 5 is a section taken on the line B B. Fig. 6 is an enlarged side elevation of a crank and crank pin lubricated with my improved crank pin oiler.

The fly wheel 2 on the side of the engine on which the oiler is attached is bolted to the flange 3 of the crank shaft by four bolts, as better shown in Fig. 4.

The oiler cylinder frame 5 is rigidly attached to the flange 3 by screws, Fig. 4, and holes 7 are drilled through the bottom of each of the four cylinders 8 registering with the four holes 9, two of which are shown in Fig. 1, that run to the four crank pins of the engine for which this particular oiler is adapted.

In Fig. 6, in the crank pin 81 is shown in dotted lines the oil hole 82 through which the hard oil is forced by my improved oiler through one of the holes 9, Fig. 1.

Pistons 10 slidable in the cylinders 8 are rigidly attached by screws 11, Fig. 1, to the inside gear case 12.

The stud 13 which is screwed into the cylinder frame 5 shoulders on it at 14 and has on the other end thereof a fine pitched thread 15 fitting the stud gear 16, which has gear teeth cut on its larger diameter 17.

The inside gear case 12 and the outside gear case 18, which are clamped together by screws 19, as better shown in the end view in Fig. 2, carry together in a press-fit the internal gear 20 which meshes with the two planet gears 21 and 22. These planet gears have riveted thereon the pinions 23 and 24, respectively.

The pinion 23 drives through the idler gear 25, Fig. 3, the intermediate gear 26, which is riveted to the plate 27.

Mounted on the plate 27 and a similar plate 28, which is riveted thereto at 29, Fig. 3, the planet gear 22, Fig. 1, carrying the pinion 24 which is riveted thereto, as shown in Fig. 1, drives through the pinion 24 and the idler gear 32, Fig. 5, the stud gear 16, which as before stated, is threaded to the stud 13 at 15, Fig. 1.

The pendulum 33 journaled on the stud gear 16 at 34 carries on the shoulder screws 35 and 36, Fig. 3, the combined planet gear and pinions 21 and 23 and the idler gear 25, and has in combination with these gears and pinions sufficient inertia to prevent its rotation when the stud gear 16 is turned forward at the stud 13 through the operation of the two planet trains.

As an alternative construction a mechanical drag consisting of a spring controlled wiper 37 mounted on the frame of the engine at 38 by a spring 39, Fig. 1, is provided to assist the weight or inertia of the pendulum 33 in preventing the rotation of the planet train mounted thereon. At the same time it allows the rotation of the pendulum 33 without injury when the stud gear 16 has been screwed on to the stud 13 a sufficient amount to cause the pistons 10 to bottom in the cylinders 8.

The number of teeth in the gears and pinion and the pitch of the screw threads on the stud 13 and stud gear 16 are merely conventional representations of such and are not to be taken as the proper pitches or the gear ratios for the operation of this oiler. In my oiler I prefer to use 151 teeth in the internal gear 20, 60 teeth in the intermediate gear 26, 50 teeth in the planet gears 21 and 22, 20 teeth in the pinions 23 and 24, and 60 teeth in the stud gear 16, the number of teeth in the two idler gears 25 and 32 being immaterial. I also prefer to have 16 threads per inch on the stud 13 at 15.

With the ratio of gears as here set forth the stud gear 16 will be turned one revolution to every 22,500 revolutions of the crank shaft 1. With an engine making 600 revolutions per minute the stud gear 16 will make one revolution every 37½ minutes, and the stud gear would therefore travel toward the fly wheel one inch in ten hours, thus giving a travel of the pistons 10 in the cylinders 8 of one inch in ten hours, and when the cylinders 8 have been filled with hard oil each crank pin will receive a certain definite amount of lubrication for every revolution of the engine and a sufficient supply is provided for an entire day's run of the engine. The forward travel of the stud gear 16 which carries with it the complete gear case as well as the pistons will of course uncover the stud 13 in its travel, and the amount of the stud so uncovered serves at all times as a measure of the amount of lubricant still left to be fed to the engine.

When the lubricant has all been fed out, the pistons bottom in their cylinders and the stud gear 16 cannot of course be fed farther down on the stud 13 but will therefore be carried with it at the same speed as the stud, which is engine speed, and the two trains of planet gears will revolve about the stud as a whole, the gears themselves not turning on their shafts.

A squared end 40, Fig. 2, is provided on the stud 13 so that when all the lubricant has been fed from the cylinders 8, by turning this squared end the stud may be unscrewed from the cylinder frame 5, and in this operation the stud will also be screwed part of the way back in the stud gear 16, but as the thread in the cylinder frame 5 is coarser than in the stud gear 16 the stud will be removed before it is screwed entirely back to its initial position in the stud gear 16. After the removal of the stud the pistons 10 may be withdrawn from the cylinders 8, the gear case, pistons and stud as a unit removed, and the stud screwed back as far as possible into the stud gear 16.

After the cylinders 8 have been refilled with lubricant the pistons are again placed in their respective cylinders and the stud screwed into the cylinder frame 5, which will bring the stud 13 back to its initial operating position in respect to the stud gear 16, as a sufficient length of thread is provided to allow screwing of the stud home into the cylinder frame and yet leave sufficient thread for the operation of the full stroke of the pistons 10.

While I have described my invention with one particular type of oiler and a certain arrangement of parts, I do not wish it understood that I limit myself to this construction, as it is evident that my invention may be embodied in many different ways within the scope of the following claims.

Claims:

1. In a crank pin oiler adapted to be used with an engine having a crank shaft, a crank pin in said crank shaft and an opening in said crank shaft leading to said crank pin, the combination of an oil cylinder communicating with said opening in said crank shaft and adapted to carry a supply of oil, a piston slidable in said oil cylinder, and means actuated by the rotation of said crank shaft for sliding said piston into said oil cylinder, said means being controlled by an inertia member coacting therewith.

2. In a crank pin oiler adapted to be used with an engine having a crank shaft, a crank pin having a bearing surface in said crank shaft, said crank shaft having an opening leading to the bearing surface of said crank pin, the combination of an oil cylinder communicating with said opening in said crank shaft and adapted to carry a supply of oil, a piston slidable in said oil cylinder, and means actuated by the rotation of said crank shaft for sliding said piston into said oil cylinder, said means being carried by said crank shaft without outside support.

3. In a crank pin oiler adapted to be used with an engine having a crank shaft and a crank pin, the combination of an oil reservoir, and means carried by and supported wholly by said crank shaft for feeding oil to said crank pin, an inertia member associated therewith, said means being controlled by said inertia member.

4. In a crank pin oiler, the combination of an oil cylinder, means whereby oil forced from said cylinder may be led therefrom, a piston slidable in said oil cylinder, a rotatable member adapted to slide said piston into said cylinder when rotated, said rotatable member being supported wholly by the crank, and an inertia member controlling the actuation of said piston by said rotatable member.

5. In a crank pin oiler adapted to be used with an engine having a crank shaft, and a crank pin in said crank shaft, the combination of a cylinder adapted to contain oil, an oil conducting means leading from said cylinder to said crank pin, a piston slidable in said cylinder, rotatable means carried by said crank shaft for sliding said piston into said cylinder when actuated, and frictional means serving as a drag on said rotatable means for actuating said rotatable means.

6. In a crank pin oiler adapted to be used with an engine having a crank shaft, a crank pin in said crank shaft, the combination of a cylinder adapted to contain oil, means whereby oil from said cylinder may be led to said crank pin, a piston slidable in said cylinder, said cylinder being mounted on said crank shaft and rotatable therewith, a gear case carrying said slidable piston, said gear case revolving with said crank shaft, and otherwise free of support, a set of reducing gears in said gear case, rotatable means actuated by said reducing gears for sliding said piston in said cylinder, and an inertia member controlling the rotation of said rotatable means.

7. In a crank pin oiler adapted to be used with an engine having a crank shaft, a crank pin in said crank shaft, the combination of a cylinder adapted to contain oil mounted on one end of said crank shaft, means whereby oil from said cylinder may be fed to said crank pin through said crank shaft, a piston slidable in said cylinder, a gear case carrying said piston, said gear case, piston and cylinder revolving with said crank shaft and having no outside support, a stud having a thread at one end thereof associated with said cylinder and said gear case, an actuating member threaded to said stud and adapted to slide said piston into said cylinder when screwed on to said stud in one direction, a set of planet gears within said gear case adapted to screw said actuating member along said stud, and an inertia member controlling the operation of said set of planet gears.

CHARLES A. STICKNEY.

Copies of this patent may be obtained for five cents each, by addressing the "Commissioner of Patents, Washington, D. C."